United States Patent
Valiquette et al.

(10) Patent No.: US 10,569,887 B2
(45) Date of Patent: Feb. 25, 2020

(54) HEAT EXCHANGER BLOCKAGE DETECTION TO PREVENT RAM AIR FAN SURGE

(71) Applicant: Hamilton Sundstrand Corporation, Charlotte, NC (US)

(72) Inventors: Patrick Valiquette, Chicopee, MA (US); Erin G. Kline, Vernon, CT (US); Christopher McAuliffe, Windsor, CT (US); Thomas M. Zywiak, Southwick, MA (US); James Joyce, Bristol, CT (US); Lauren Kodet, Simsbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 181 days.

(21) Appl. No.: 15/923,598

(22) Filed: Mar. 16, 2018

(65) Prior Publication Data
US 2019/0285324 A1    Sep. 19, 2019

(51) Int. Cl.
*B64D 13/06*    (2006.01)
*B64D 13/08*    (2006.01)

(52) U.S. Cl.
CPC ...... *B64D 13/08* (2013.01); *B64D 2013/0618* (2013.01); *F25B 2700/21* (2013.01)

(58) Field of Classification Search
CPC .................. B64D 2013/0618; F25B 2700/021
See application file for complete search history.

(56) References Cited

U.S. PATENT DOCUMENTS

| | | | |
|---|---|---|---|
| 9,816,720 B2 | 11/2017 | Zywiak et al. | |
| 2005/0279208 A1* | 12/2005 | Schwalm | B01D 53/22 96/4 |
| 2015/0059397 A1* | 3/2015 | Bruno | B64D 13/06 62/402 |
| 2015/0166186 A1 | 6/2015 | Zywiak et al. | |
| 2015/0314878 A1* | 11/2015 | Lukens | F02C 6/08 62/61 |
| 2016/0238332 A1 | 8/2016 | Lambert et al. | |
| 2016/0320291 A1 | 11/2016 | Najjar et al. | |
| 2017/0242956 A1 | 8/2017 | Zywiak et al. | |
| 2018/0051945 A1* | 2/2018 | Hanov | F28F 27/00 |

FOREIGN PATENT DOCUMENTS

EP    3118459 A1    1/2017

OTHER PUBLICATIONS

Extended European Search Report for EP Application No. 19157801. 2, dated Aug. 9, 2019, pp. 8.

* cited by examiner

*Primary Examiner* — David J Teitelbaum
(74) *Attorney, Agent, or Firm* — Kinney & Lange, P.A.

(57) ABSTRACT

A system and method onboard an aircraft includes a ram air temperature sensor, a bleed air temperature sensor, a valve, and a controller. The ram air temperature sensor is positioned to sense a ram air temperature of a ram air flow. The bleed air temperature sensor is positioned to sense a bleed air temperature of a bleed air flow, wherein the bleed air flow is cooled by a heat exchanger using the ram air flow. The valve is configured to control the bleed air flow upstream of the heat exchanger. The controller is configured to determine a bleed air threshold based on the ram air temperature, and control the valve to reduce the bleed air flow in response to the bleed air temperature reaching the bleed air threshold.

20 Claims, 2 Drawing Sheets

HEAT EXCHANGER BLOCKAGE DETECTION TO PREVENT RAM AIR FAN SURGE

BACKGROUND

The present invention is related to aircraft heat exchangers, and in particular to a system and method for detecting contamination and blockage in heat exchangers to prevent ram air fan surge.

Aircraft often include environmental control systems (ECS) that provide cool, pressurized air for the aircraft. Each ECS may also include one or more ram air fans that draw air through heat exchangers to provide air-to-air cooling for a bleed air flow, for example. Contamination from the ambient air may increase the pressure drop across the heat exchangers, reducing the air flow through the fan. Significant heat exchanger contamination can reduce the air flow enough that the ram air fan may operate in an unstable operating mode, which may lead to mechanical damage or failure of the fan and/or other components of an air cycle machine coupled to the fan.

SUMMARY

A system onboard an aircraft includes a ram air temperature sensor, a bleed air temperature sensor, a valve, and a controller. The ram air temperature sensor is positioned to sense a ram air temperature of a ram air flow. The bleed air temperature sensor is positioned to sense a bleed air temperature of a bleed air flow, wherein the bleed air flow is cooled by a heat exchanger using the ram air flow. The valve is configured to control the bleed air flow upstream of the heat exchanger. The controller is configured to determine a bleed air threshold downstream of the compressor based on the ram air temperature, and control the valve to reduce the bleed air flow in response to the bleed air temperature reaching the bleed air threshold.

A method of detecting blockage of a heat exchanger includes determining a ram air temperature of a ram air flow to the heat exchanger, wherein the heat exchanger is configured to provide cooling for a bleed air flow using the ram air flow; determining a bleed air temperature threshold based on the ram air temperature and a standard day temperature; sensing a bleed air temperature of the bleed air flow downstream of the heat exchanger; comparing the bleed air temperature to the bleed air temperature threshold; and reducing the bleed air flow upstream of the heat exchanger if the bleed air temperature is greater than or equal to the bleed air threshold.

An aircraft environmental control system includes a heat exchanger, a ram fan, a bleed valve, and a controller. The ram fan is configured to draw a ram flow through the heat exchanger from a ram inlet. The heat exchanger is configured to provide cooling for a bleed air flow using the ram flow. The bleed valve is configured to control the bleed air flow from a bleed air source to the heat exchanger. The controller is configured to calculate a bleed air temperature threshold based on a difference between an ambient temperature and a standard day temperature; and control the bleed valve to reduce the bleed air flow in response to a bleed temperature of the bleed air flow downstream of the heat exchanger reaching the bleed air temperature threshold.

DETAILED DESCRIPTION

Figure 1:
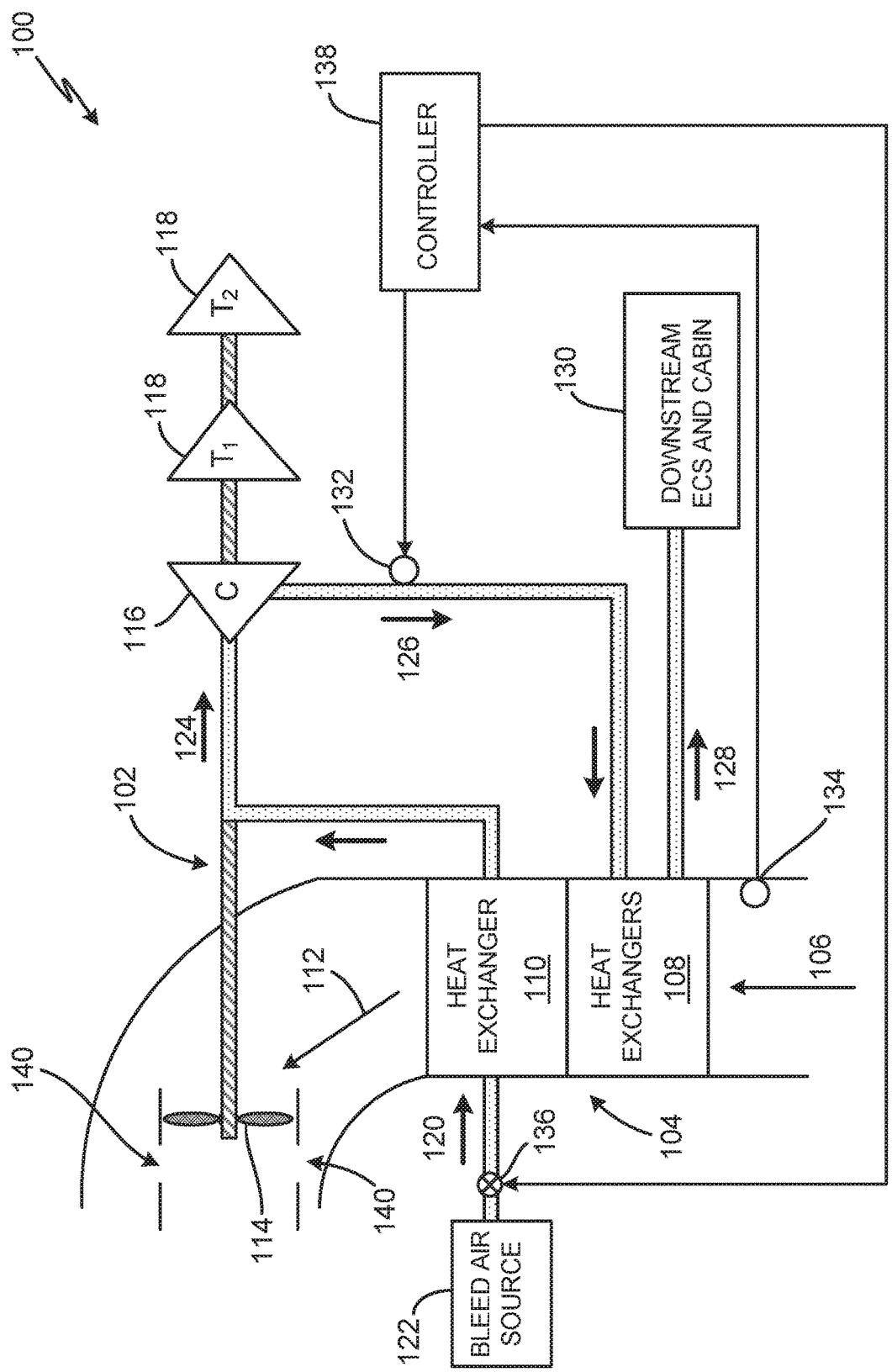
FIG. 1 is a block diagram that illustrates an environmental control system for an aircraft.

FIG. 1 is a block diagram that illustrates environmental control system (ECS) 100 for an aircraft. ECS 100 includes air cycle machine (ACM) 102 and heat exchanger system 104. Heat exchanger system 104 includes ram air inlet 106, heat exchangers 108, heat exchanger 110, and ram air outlet 112. Heat exchanger 110 may be a primary heat exchanger, and heat exchangers 108 may be a set of secondary heat exchangers, for example. ACM 102 includes fan 114, compressor 116, and turbines 118. Fan 114 is positioned and operable to draw a ram air flow through each of ram air inlet 106, heat exchangers 108, and heat exchanger 110, thereafter exiting ram air outlet 112.

Bleed air flow 120 is cooled in heat exchanger 110 by ram air drawn through ram air inlet 106 by fan 114. Bleed air flow 120 is provided by bleed air source 122, which may be a gas turbine engine compressor, for example. After being cooled in heat exchanger 110, bleed air flow 124 is provided to, and compressed by, compressor 116. Once compressed, bleed flow 126 is provided to, and cooled by, heat exchangers 108. After passing through heat exchangers 108, bleed air flow 128 is provided to, and used by, various downstream ECS and cabin components 130, such as for environmental control of the pressurized cabin.

While in use on the ground, ram air inlet 106 may ingest various contaminants that may inhibit the ability of heat exchanger 110 to cool bleed air flow 120. The contaminants, which may include sand, dust, dirt, or any other particle or item that may be ingested through ram air inlet 106, may partially or fully prevent ram air from reaching fan 114, while also preventing efficient cooling of bleed air flow 120. Additionally, the partially or fully blocked ram air may lead to a drop in pressure upstream of fan 114. The pressure drop across heat exchanger 110 can lead to a reduction in air flow through heat exchanger 110, which may lead to a reduced air flow through fan 114 causing fan 114 to operate in an unstable operational mode that can eventually lead to surge. It is advantageous to detect contamination of heat exchanger 110 so as to avoid any possible damage to any of the components of ACM 102.

To increase surge margins for fan 114, ECS 100 may also include fan ejector 140. Fan ejector 140 is a gap in the shroud surrounding fan 114. Typically, the shroud is utilized to prevent back-flow of air, and may also be used to contain the fan blades in the rare case of catastrophic failure. Fan ejector 140 allows for air that has passed through fan 114 to cycle back into the inlet of fan 114 in the event that the flow at the inlet of fan 114 is reduced. As such, this increased flow at the inlet of fan 114 by fan ejector 140 increases the surge margin of safe operation of fan 114, for example, from a typically-safe surge margin range of 20%-30% to a higher surge margin range of up to 50%.

To prevent fan surge, controller 138 may detect heat exchanger blockage by monitoring the cooling of bleed air 120 by heat exchanger 110. Bleed air temperature sensor 132 may be positioned to sense the temperature of bleed air flow 126, which may be measured and monitored by controller 138. Bleed air temperature sensor 132 is located downstream of compressor 116 and upstream of heat exchangers 108.

As illustrated in FIG. 1, heat exchanger system 104 may include ram air temperature sensor 134 positioned to sense the temperature of ram air entering ram air inlet 106, which may be measured and monitored by controller 138. Ram air temperature sensor 134 is located upstream of heat exchangers 108. Though illustrated and described as including ram air temperature sensor 134, in other embodiments, controller 138 may be configured to estimate the temperature of air at ram air inlet 106 using data from other aircraft systems, such as an ambient temperature.

Valve 136 is positioned to control bleed air flow 120 through heat exchanger 110. Valve 136 is located downstream of bleed air source 122 and upstream of heat exchanger 110. Valve 136 may be controlled to reduce the flow of bleed air through heat exchanger 110, which decreases the amount of bleed air flow 120 that is cooled in heat exchanger 110. A lower amount of bleed air flow 120 reduces the heat sink on the ram air flow through heat exchanger 110, which allows system 100 to tolerate some blockage of heat exchangers 108 and 110 while maintaining adequate surge margin for ACM 102.

Bleed air temperature sensor 132, ram air temperature sensor 134, and valve 136 are operatively coupled to controller 138. Controller 138 may be a single unit, a control system composed of various parts, a distributed network, or other such system capable of monitoring and directing bleed air temperature sensor 132, ram air temperature sensor 134, and valve 136.

For ground operation, controller 138 may be configured to determine a bleed air temperature threshold indicative of contamination of heat exchangers 108 and 110. Controller 138 may be configured to calculate a standard day temperature, which is a prediction of ambient temperature based on an altitude of the aircraft. The standard day temperature may be compared to the actual ambient temperature of the aircraft to determine a temperature difference. The temperature difference may be used to determine the bleed air temperature threshold, which may be a bleed air temperature indicative of a 50% surge margin of fan 114, for example. Further adjustments may be made to the threshold temperature. For example, if the actual ambient temperature is below 0° F., then the threshold may automatically be set at 100° F. The threshold may also vary depending on, for example, whether bleed air source 122 is an auxiliary power unit (APU) or a primary gas turbine engine, and/or the number of air conditioning packs on the aircraft.

Controller 138 monitors the temperature at the output of compressor 116 using sensor 132 and compares the sensed temperature to the bleed air temperature threshold. If the sensed temperature has reached the bleed air temperature threshold, controller 138 controls bleed air valve 136 to reduce bleed air flow 120 to heat exchanger 110 to maintain the actual temperature of bleed air flow 126 at or close to the bleed air temperature threshold. Upon reaching the bleed air temperature threshold, controller 138 may generate a maintenance message indicating that heat exchangers 108 and 110 require maintenance. However, if bleed air flow 120 is reduced below a minimum flow threshold, ECS 100 may be shut down. The minimum flow threshold may vary depending on, for example, whether bleed air source 122 is an auxiliary power unit (APU) or a primary gas turbine engine, and/or the number of air conditioning packs on the aircraft.

In-flight control may operate in a similar manner, but with the bleed air temperature threshold and the minimum flow threshold being adjusted. An in-flight threshold may be set for normal operation, assuming no control of bleed air flow 120 occurred on the ground. If control of bleed air flow 120 occurred on the ground, the bleed air temperature threshold may be reduced. For example, if the threshold for normal operation is 415° F., the threshold may be reduced to 300° F. as a result of on-ground control of bleed air flow 120. These thresholds may vary depending on, for example, whether bleed air source 122 is an auxiliary power unit (APU) or a primary gas turbine engine, and the number of air conditioning packs on the aircraft.

Figure 2:
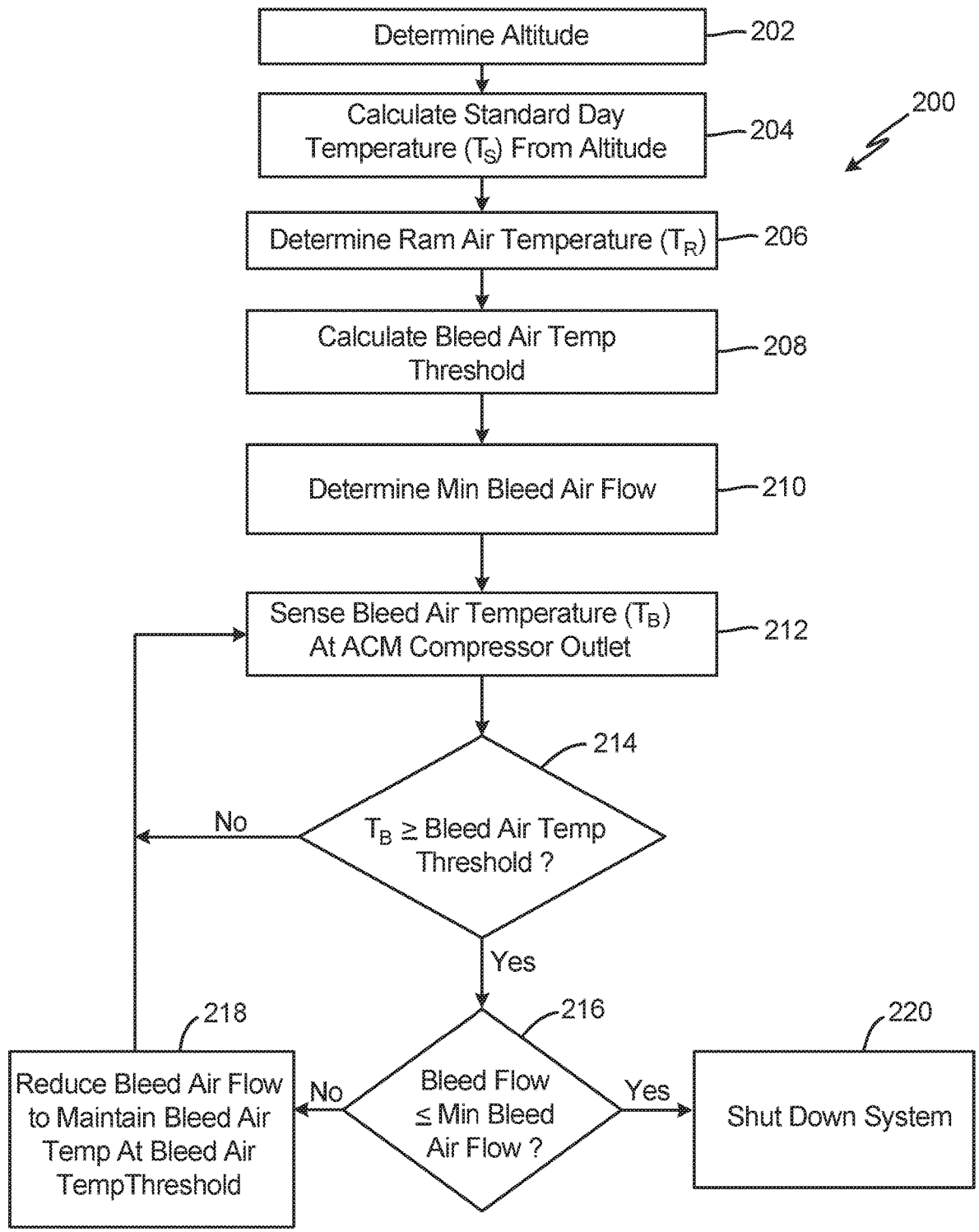
FIG. 2 is a flow chart of a method for blockage detection of a heat exchanger.

With continued reference to FIG. 1, FIG. 2 is a flow chart of method 200 for ground-based blockage detection in a heat exchanger 110 in ECS 100. At step 202, controller 138 determines an altitude of the aircraft. The altitude reading may be determined by a component of ECS 100, or may be received from another part of the aircraft system, such as aircraft avionics. In another embodiment, the altitude may be estimated by calculating a prediction based on atmospheric conditions.

At step 204, controller 138 calculates a standard day temperature ($T_S$) using the altitude from step 202. $T_S$ may be the ambient air temperature from the International Standard Atmosphere (ISA) based on the determined altitude of the aircraft. At step 206, controller 138 determines the temperature ($T_R$) of the ram air flow at ram air inlet 106. $T_R$ may be a sensed temperature of the ram air flow as it enters heat exchanger system 104 at ram air inlet 106, or may be estimated based on received data from another aircraft system.

Using temperatures $T_S$ and $T_R$, controller 138 calculates a threshold bleed air temperature at step 208. The threshold bleed air temperature may be indicative of a 50% surge margin for ram fan 114 given temperatures $T_S$ and $T_R$. At step 210, controller 138 determines a minimum flow for bleed air flow 126. The minimum flow may be indicative of fan 114 approaching a surge condition.

At step 212, controller 138 senses the bleed air temperature ($T_B$) of bleed air flow 126. Controller 138 compares temperature $T_B$ to the bleed air temperature threshold at step 214 to determine if there is an indication of blockage in heat exchangers 108 or 110. If at step 214 there is no indication of blockage, then method 200 returns to step 212 to continuously monitor the temperature of bleed air flow 126. If at step 214 there is an indication of blockage, then method 200 proceeds to step 216 and compares the present bleed flow 120 to the minimum flow determined at step 210. If the bleed flow is less than the minimum flow, method 200 proceeds to step 220 and shuts down ECS 100. If the bleed flow is greater than the minimum flow, method 200 proceeds to step 218 and controls bleed flow 120 to control the temperature of bleed air flow 126.

At step 218, ECS 100 may also generate and post a maintenance message indicating that the bleed air temperature has reached the bleed air threshold and that the heat exchangers require service. Additionally, once the bleed air temperature has reached the bleed air threshold and the minimum flow has been met, ECS 100 may allow some additional increase in temperature prior to shutting down ECS 100. For example, in a single pack system, ECS 100 may tolerate another 30° F. rise in temperature of the bleed air prior to shutting down, and in a dual pack system, ECS 100 may tolerate another 10° F. rise in temperature of the bleed air prior to shutting down.

In other embodiments, fan 114 may be an electric fan driven by a motor controller. In these embodiments, instead of shutting down ECS 100 at step 220 to prevent damage, the motor controller may operate fan 114 in a safe mode by decreasing the speed of fan 114. The decreased speed may be a speed that ensures fan 114 will not experience surge or will survive a surge event.

Discussion of Possible Embodiments

A system onboard an aircraft includes a ram air temperature sensor, a bleed air temperature sensor, a valve, and a controller. The ram air temperature sensor is positioned to sense a ram air temperature of a ram air flow. The bleed air temperature sensor is positioned to sense a bleed air temperature of a bleed air flow, wherein the bleed air flow is cooled by a heat exchanger using the ram air flow. The valve is configured to control the bleed air flow upstream of the heat exchanger. The controller is configured to determine a bleed air threshold based on the ram air temperature, and control the valve to reduce the bleed air flow in response to the bleed air temperature reaching the bleed air threshold. The bleed air threshold is indicative of blockage of the heat exchanger.

The system of the preceding paragraph can optionally include, additionally and/or alternatively, any one or more of the following features, configurations and/or additional components:

A further embodiment of the foregoing system, wherein the controller is configured to determine a difference between the ram air temperature and a standard day temperature; and determine the bleed air threshold based on the difference between the ram air temperature and the standard day temperature.

A further embodiment of any of the foregoing systems, wherein the controller is configured to determine the standard day temperature based on an altitude of the aircraft.

A further embodiment of any of the foregoing systems, further including a ram fan configured to draw the ram air flow through the heat exchanger.

A further embodiment of any of the foregoing systems, wherein the controller is further configured to determine a minimum flow of the bleed air flow; and shut down the system in response to the bleed air flow reaching the minimum flow to prevent surge of the ram fan.

A further embodiment of any of the foregoing systems, further including an air cycle machine that includes a compressor driven by a turbine, wherein the bleed air temperature sensor is positioned to sense the bleed air temperature of the bleed air flow at an outlet of the compressor.

A further embodiment of any of the foregoing systems, further including a fan ejector configured to recirculate a portion of air flow exiting an outlet of the ram fan to an inlet of the ram fan.

A further embodiment of any of the foregoing systems, wherein the bleed air flow is received from an auxiliary power unit of the aircraft.

A further embodiment of any of the foregoing systems, wherein the bleed air flow is received from a main gas turbine engine of the aircraft.

A method of detecting blockage of a heat exchanger includes determining a ram air temperature of a ram air flow to the heat exchanger, wherein the heat exchanger is configured to provide cooling for a bleed air flow using the ram air flow; determining a bleed air temperature threshold indicative of blockage of the heat exchanger based on the ram air temperature and a standard day temperature; sensing a bleed air temperature of the bleed air flow downstream of the heat exchanger; comparing the bleed air temperature to the bleed air temperature threshold; and reducing the bleed air flow upstream of the heat exchanger if the bleed air temperature is greater than or equal to the bleed air threshold.

The method of the preceding paragraph can optionally include, additionally and/or alternatively, any one or more of the following features, configurations and/or additional components:

A further embodiment of the foregoing method, wherein a ram fan is configured to draw the ram air flow through the heat exchanger, and wherein the method further includes determining a minimum flow of the bleed air flow; and shutting down the bleed air flow if the bleed air flow is at or below the minimum flow.

A further embodiment of any of the foregoing methods, wherein sensing the bleed air temperature of the bleed air flow downstream of the heat exchanger includes sensing the bleed air temperature at an outlet of a compressor of an air cycle machine coupled to the ram fan.

A further embodiment of any of the foregoing methods, further including generating a maintenance message if the bleed air temperature is greater than or equal to the bleed air threshold.

A further embodiment of any of the foregoing methods, further including determining an altitude of an aircraft that includes the heat exchanger; and calculating the standard day temperature based on the altitude.

An aircraft environmental control system includes a heat exchanger, a ram fan, a bleed valve, and a controller. The ram fan is configured to draw a ram flow through the heat exchanger from a ram inlet. The heat exchanger is configured to provide cooling for a bleed air flow using the ram flow. The bleed valve is configured to control the bleed air flow from a bleed air source to the heat exchanger. The controller is configured to calculate a bleed air temperature threshold based on a difference between an ambient temperature and a standard day temperature, wherein the bleed air temperature threshold is indicative of blockage of the heat exchanger; and control the bleed valve to reduce the bleed air flow in response to a bleed temperature of the bleed air flow downstream of the heat exchanger reaching the bleed air temperature threshold.

The system of the preceding paragraph can optionally include, additionally and/or alternatively, any one or more of the following features, configurations and/or additional components:

A further embodiment of the foregoing system, further including an air cycle machine that includes a compressor, wherein the air cycle machine is coupled to the ram fan; and a temperature sensor positioned to sense the bleed temperature at an outlet of the compressor and provide the bleed temperature to the controller.

A further embodiment of any of the foregoing systems, wherein the controller is further configured to calculate a minimum bleed flow; and shut down the ram fan if the bleed air flow from the bleed air source reaches the minimum flow to prevent surge of the ram fan.

A further embodiment of any of the foregoing systems, wherein the controller is configured to determine the standard day temperature based on an altitude of the aircraft.

A further embodiment of any of the foregoing systems, wherein the bleed air source is an auxiliary power unit of the aircraft.

A further embodiment of any of the foregoing systems, wherein the bleed air source is received from a main gas turbine engine of the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A system onboard an aircraft, the system comprising:
   a ram air temperature sensor positioned to sense a ram air temperature of a ram air flow;
   a bleed air temperature sensor positioned to sense a bleed air temperature of a bleed air flow, wherein the bleed air flow is cooled by a heat exchanger using the ram air flow;
   a valve configured to control the bleed air flow upstream of the heat exchanger; and
   a controller configured to determine a bleed air temperature threshold based on the ram air temperature, wherein the controller is further configured to control the valve to reduce the bleed air flow in response to the bleed air temperature reaching the bleed air temperature threshold, and wherein the bleed air threshold is indicative of blockage of the heat exchanger.

2. The system of claim 1, wherein the controller is configured to:
   determine a difference between the ram air temperature and a standard day temperature; and
   determine the bleed air temperature threshold based on the difference between the ram air temperature and the standard day temperature.

3. The system of claim 2, wherein the controller is configured to determine the standard day temperature based on an altitude of the aircraft.

4. The system of claim 1, further comprising:
   a ram fan configured to draw the ram air flow through the heat exchanger.

5. The system of claim 4, wherein the controller is further configured to:
   determine a minimum flow of the bleed air flow; and
   shut down the system in response to the bleed air flow reaching the minimum flow to prevent surge of the ram fan.

6. The system of claim 4, further comprising:
   an air cycle machine that includes a compressor driven by a turbine, wherein the bleed air temperature sensor is positioned to sense the bleed air temperature of the bleed air flow at an outlet of the compressor.

7. The system of claim 6, further comprising a fan ejector configured to recirculate a portion of air flow exiting an outlet of the ram fan to an inlet of the ram fan.

8. The system of claim 1, wherein the bleed air flow is received from an auxiliary power unit of the aircraft.

9. The system of claim 1, wherein the bleed air flow is received from a main gas turbine engine of the aircraft.

10. A method of detecting blockage of a heat exchanger, the method comprising:
    determining a ram air temperature of a ram air flow to the heat exchanger, wherein the heat exchanger is configured to provide cooling for a bleed air flow using the ram air flow;
    determining a bleed air temperature threshold indicative of blockage of the heat exchanger based on the ram air temperature and a standard day temperature;
    sensing a bleed air temperature of the bleed air flow downstream of the heat exchanger;
    comparing the bleed air temperature to the bleed air temperature threshold; and
    reducing the bleed air flow upstream of the heat exchanger if the bleed air temperature is greater than or equal to the bleed air threshold.

11. The method of claim 10, wherein a ram fan is configured to draw the ram air flow through the heat exchanger, and wherein the method further comprises:
    determining a minimum flow of the bleed air flow; and
    shutting down the bleed air flow if the bleed air flow is at or below the minimum flow.

12. The method of claim 11, wherein sensing the bleed air temperature of the bleed air flow downstream of the heat exchanger comprises sensing the bleed air temperature at an outlet of a compressor of an air cycle machine coupled to the ram fan.

13. The method of claim 10, further comprising generating a maintenance message to indicate blockage of the heat exchanger if the bleed air temperature is greater than or equal to the bleed air threshold.

14. The method of claim 10, further comprising:
    determining an altitude of an aircraft that includes the heat exchanger; and
    calculating the standard day temperature based on the altitude.

15. An aircraft environmental control system comprising:
    a heat exchanger;
    a ram fan configured to draw a ram flow through the heat exchanger from a ram inlet, wherein the heat exchanger is configured to provide cooling for a bleed air flow using the ram flow;
    a bleed valve configured to control the bleed air flow from a bleed air source to the heat exchanger; and
    a controller configured to:
      calculate a bleed air temperature threshold based on a difference between an ambient temperature and a standard day temperature, wherein the bleed air temperature threshold is indicative of blockage of the heat exchanger; and
      control the bleed valve to reduce the bleed air flow in response to a bleed temperature of the bleed air flow downstream of the heat exchanger reaching the bleed air temperature threshold.

16. The aircraft environmental control system of claim 15, further comprising:
    an air cycle machine that includes a compressor, wherein the air cycle machine is coupled to the ram fan; and
    a temperature sensor positioned to sense the bleed temperature at an outlet of the compressor and provide the bleed temperature to the controller.

17. The aircraft environmental control system of claim 15, wherein the controller is further configured to:
    calculate a minimum bleed flow; and
    shut down the ram fan if the bleed air flow from the bleed air source reaches the minimum flow to prevent surge of the ram fan.

18. The aircraft environmental control system of claim 15, wherein the controller is configured to determine the standard day temperature based on an altitude of the aircraft.

19. The aircraft environmental control system of claim 15, wherein the bleed air source is an auxiliary power unit of the aircraft.

20. The aircraft environmental control system of claim 15, wherein the bleed air source is received from a main gas turbine engine of the aircraft.

* * * * *